UNITED STATES PATENT OFFICE.

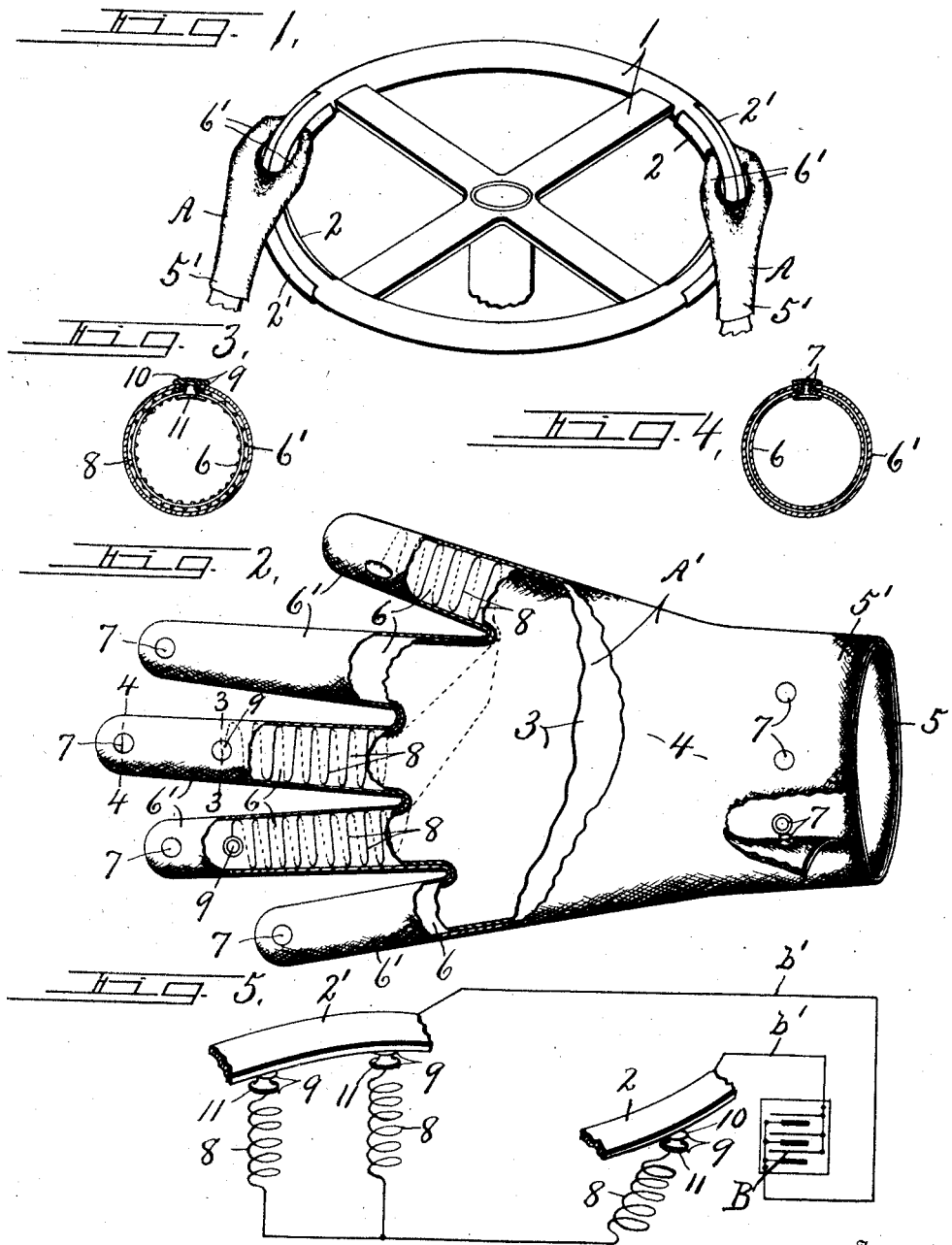

ARTHUR L. CARRON, OF BINGHAMTON, NEW YORK.

ELECTRIC-HEATED GLOVE.

1,011,574. Specification of Letters Patent. Patented Dec. 12, 1911.

Application filed September 9, 1911. Serial No. 648,552.

*To all whom it may concern:*

Be it known that I, ARTHUR L. CARRON, of Binghamton, in the county of Broome, in the State of New York, have invented new and useful Improvements in Electric-Heated Gloves, of which the following, taken in connection with the accompanying drawings, is a full, clear, and exact description.

This invention relates to certain improvements in electrically heated wearing apparel such as gloves, mittens and the like for drivers of aeroplanes, automobiles, motor boats and other conveyances which are guided by manually operated steering mechanism. These mechanisms are usually controlled by suitable hand wheels which are necessarily gripped more or less firmly and constantly by one or both hands so that in extremely cold atmospheres and particularly when driving at a high rate of speed, the hands of the operator are liable to become frozen or numbed to such an extent as to lose control of the machine and thereby endanger the life of the driver and other occupants of the machine.

The object, therefore, of my present invention is to provide a suitable glove or mitten which may be worn with the same freedom of movement as any ordinary covering of this character and electrically heated at will by simply gripping or shifting the hands on the steering wheel. In other words, I have sought to incorporate the electric heaters in the gloves or mittens in such manner as to envelop portions at least of the fingers and at the same time afford free action of the hands and fingers in manipulating the steering wheel.

Another object is to enable the operator to open and close the heating circuit at will without removing the hands from the steering wheel by providing the gloves or mittens and steering wheel with coöperative contacts forming parts of such circuit whereby the movements of the operator are unhampered by any wires or similar connections which would restrict such movements, the gloves or mittens being free from any connections with the circuit except through the contacts.

Other objects and uses will be brought out in the following description:

In the drawings:—Figure 1 is a perspective view of a portion of a steering wheel of an automobile, aeroplane, motor boat or similar vehicle showing contact members of an electric circuit therein coöperating with similar contacts on the gloves or mittens of the hands which are also shown partly in perspective in gripping engagement with the wheel. Fig. 2 is an enlarged plan partly in perspective and partly in section of a glove embodying the features of my invention. Figs. 3 and 4 are enlarged transverse sectional views through one of the fingers of the glove taken respectively on lines 3—3 and 4—4 Fig. 2. Fig. 5 is a diagrammatic view of the coöperative contacts and electric circuit in which the heating coils and contacts are connected. Fig. 6 is a detail sectional view partly in elevation of a pair of the slip connections forming one of the contact terminals of the heating circuit, the parts being shown as separated one from the other or about to be inserted one into the other with a slip connection.

In order that my invention may be clearly understood I have shown a steering wheel —1— having preferably a wood rim to which is secured separate sets of electric conducting strips or plates —2— and —2'— one set for each of the gloved hands as —A—, the conducting strips being insulated from each other in any well known manner not necessary to herein illustrate or describe, it being understood that the invention contemplates broadly the use of any suitable form of contacts on a steering wheel coöperating with similar contacts on the gloves or mittens to make and break the electric circuit through the heating conductors in said gloves or mittens.

I have shown in Fig. 2 a glove —A'— as the most convenient covering for the hand although it is to be understood that the invention applies equally to mittens and similar coverings for the hand or foot. The glove preferably comprises inner and outer telescoping sections —3— and —4— of substantially the same form and size except that the outer section is sufficiently large to easily receive the inner section, both glove sections being provided with wrist portions —5— and —5'— and finger portions —6— and —6'—, the remaining hand portions forming the main body. The sections —3— and —4— are therefore slipped one into the other and are made separate and detachable so that the inner section may be withdrawn from the outer section at will when necessary or desirable.

Suitable means is provided for holding the sections in their assembled relation and for this purpose I have shown the wrist portions —5— and —5'— and finger portions —6— and —6'— as provided with suitable clasps —7— preferably of the "glove button" or "skirt fastener" type, that is, each clasp is composed of two parts, one of which is secured to the outer section —4— and provided with an inwardly projecting head or button while the other part is secured to the inner glove section and provided with a socket for receiving the projection of the first-named part, thereby establishing a slip connection by which the parts may be frictionally held together or separated at will.

Certain parts of the inner section —3— of the glove, preferably one or more, in this instance three, of the fingers are provided with electric heating coils —8— of German silver or other suitable wire incorporated in the fabric of which the inner section —3— is made in such manner as to follow the cross sectional contour of the finger portions so as to envelop the fingers when the glove is placed upon the hand, that is, the fingers are inserted through the coils. The inner and outer glove sections —3— and —4— may be made of any suitable flexible materials, the inner section being preferably made of knit or textile fabric, while the outer section may be made of leather or other material having the desired wearing qualities. The wire of the heating coils —8— is wound around the fingers of the inner section —3— and is preferably incorporated in the fabric thereof by lacing as shown more clearly in Figs. 3 and 6 so as to retain the helices of the coil in fixed relation some distance apart as best shown in Fig. 2, and at the same time permitting ample flexibility for free movement of the fingers and other portions of the hand. These coils are electrically connected to each other in any well known manner and are also electrically connected to suitable contact terminals —9— as shown more clearly in Figs. 2, 3, 5 and 6, each of these contact terminals consisting of two parts constituting a clasp similar to the clasps —7— and secured in operative position to the inner and outer glove sections —3— and —4— in substantially the same manner as previously described. For example, in Fig. 6 I have shown one of these contact terminals as composed of an outer part —10— and an inner part —11—, one of the parts having a socket and the other a projection for slip connection one with the other, the outer part —10— being exposed preferably on the outer surface of the fingers of the glove covering —4— for contact with the conducting strips —2— and —2'— when the hands of the operator are in gripping position upon the steering wheel as shown in Fig. 1. These conducting strips —2— and —2'— may be connected in any suitable manner as by wires —b— and —b'— to a source of electric energy —B'— so that when the gloved hands are placed in gripping position upon the steering wheel, the operator may voluntarily move the contact terminals —9— into and out of contact with the conducting strips —2— and —2'— for closing and opening the electric circuit, thereby permitting the heating of the electric coils at will without removing the hands from the steering wheel. This is an important feature of the invention in that the hands of the operator are at all times free to manipulate the wheel and at the same time the fingers bearing the contact terminals —9— may be moved into contact with the conducting strips —2— to close the circuit through the heating coils to heat the fingers or hands whenever necessary or if the hands become overheated the fingers may be withdrawn to break the contact and placed upon any other part of the wheel without any restrictions by wires or other connections. In fact the contact terminals of the gloves are normally free from any electric connection with the source of electric energy when not voluntarily brought into contact with the conducting strips on the steering wheel, thus permitting the gloves to be taken off and laid aside any time in the same manner as any ordinary glove or mitten.

The operation of my invention will now be readily understood with reference to the foregoing description and the accompanying drawing and although I have shown the heating coils as wound around a limited number of the finger portions of the inner glove section —3—, I do not wish to limit myself to the arrangement of the coils in any particular portion of the inner glove section nor to the particular form of glove shown and described other than that the coils are arranged so as to surround at least a portion of the hand and are connected to contact terminals, portions of which are exposed at predetermined points in the surface of the glove for coöperative contact with conducting members on the steering wheel.

What I claim is:

1. A glove or mitten having incorporated therein an electric conductor provided with terminal contacts exposed at predetermined points in the surface of such glove or mitten.

2. A glove or mitten having electric coils of wire incorporated therein and contacts electrically connected to said coils and exposed at predetermined points in the surface of the glove or mitten.

3. A glove or mitten comprising an inner section having an electrical conductor incorporated therein, an outer covering-section for the inner section, and contact terminals composed of parts in slip connection with each other, one of the parts of each terminal being secured to the conductor and the other parts secured to the outer covering-section and exposed at the outer surface thereof.

4. A glove or mitten composed of inner and outer telescoping sections, a coil of electrical resistance wire incorporated in portions of the inner section and provided with terminal parts, and contact parts secured to the outer section and having slip connection with their corresponding terminal parts.

In witness whereof I have hereunto set my hand on this 28th day of August 1911.

ARTHUR L. CARRON.

Witnesses:
F. B. SACKETT,
FRANK F. OLMSTEAD.